(12) United States Patent
Mahe et al.

(10) Patent No.: US 6,328,072 B1
(45) Date of Patent: Dec. 11, 2001

(54) UNIVERSAL SAFETY DEVICE AND PROCESS FOR PROTECTING A PIPELINE

(75) Inventors: Jean-Luc Mahe, Sucy-en-Brie; Daniel Giraud, Acheres; David Leme, Alfortville; Robert Drouvin, Vernou/Brenne, all of (FR)

(73) Assignee: Gaz de France-(GDF) Service National, Paris (FR)

( * ) Notice: Subject to any disclaimer, the term of this patent is extended or adjusted under 35 U.S.C. 154(b) by 0 days.

(21) Appl. No.: 09/592,238

(22) Filed: Jun. 12, 2000

(30) Foreign Application Priority Data

Jun. 10, 1999 (FR) .................................................. 99 07346
Jan. 26, 2000 (JP) .................................................. 00 00998

(51) Int. Cl.[7] ........................................................ F15D 1/02
(52) U.S. Cl. ................................ 138/46; 138/93; 138/45; 137/118.04
(58) Field of Search .................................. 138/46, 45, 40, 138/93, 89; 137/118.04

(56) References Cited

U.S. PATENT DOCUMENTS 2,856,002 10/1958 True et al. .
3,342,216 * 9/1967 Griffin, III ............................. 138/45
4,254,791 * 3/1981 Bron ................................. 138/118.04
4,458,721 * 7/1984 Yie et al. ............................... 138/93
6,053,210 * 4/2000 Chapman et al. .................... 138/934

FOREIGN PATENT DOCUMENTS

3339572A1  5/1985  (DE) .
2155080A   9/1985  (GB) .

* cited by examiner

*Primary Examiner*—Patrick Brinson
(74) *Attorney, Agent, or Firm*—Frishauf, Holtz, Goodman, Langer & Chick, P.C.

(57) ABSTRACT

A safety device for protecting a fluid pipeline (1) from an excessive flow of the fluid running through it. The device includes a body (2) delimited by a tubular wall (20), having an upstream end (21) and a downstream end (22) and being selectively inserted into the pipeline (1). A valve (3), which is sensitive to a pressure loss, is supported by the body (2) and disposed between the upstream and downstream ends. A retaining means (4a, 4b) holds the body (2) in place inside the pipeline (1). An inflatable envelope (5) is provided outside the body for impermeably encasing a section of effective length of the tubular wall (20) into which at least one first opening (231) is cut.

24 Claims, 5 Drawing Sheets

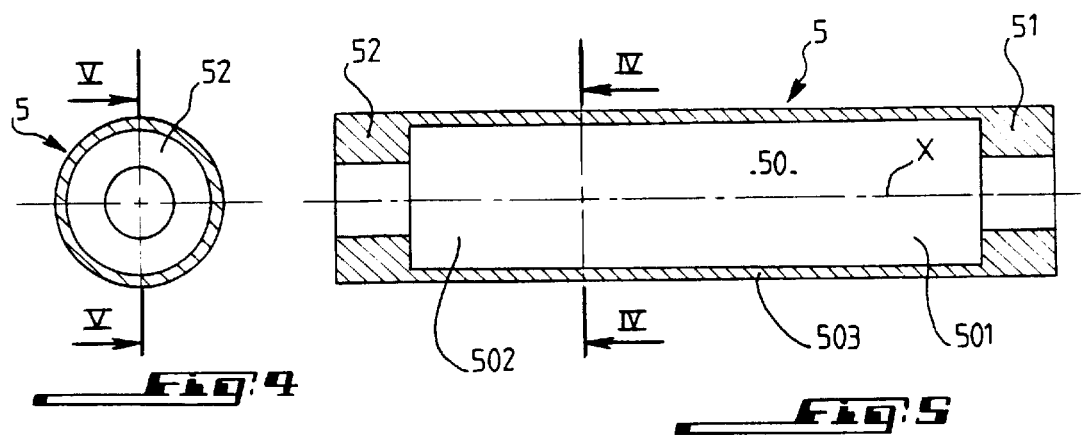
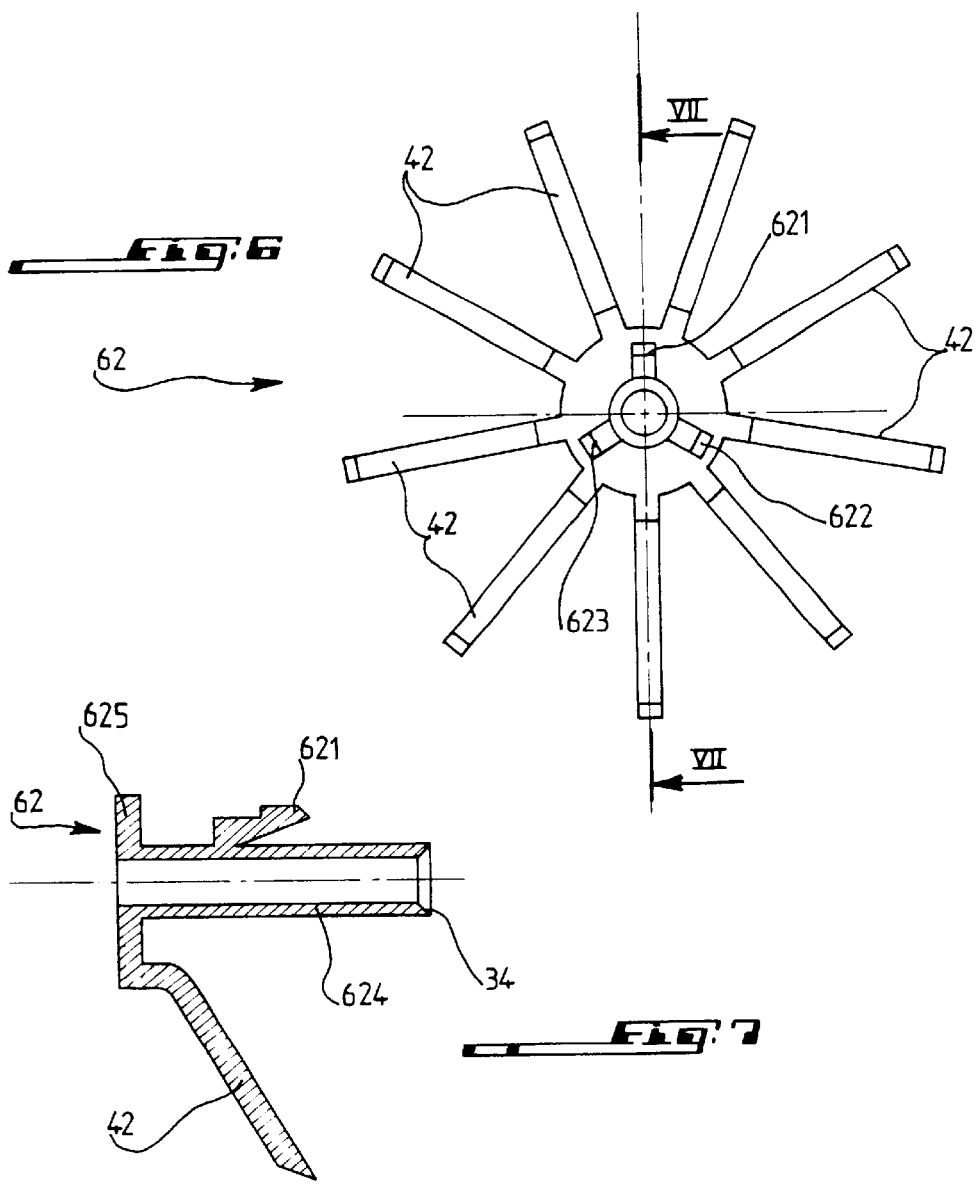

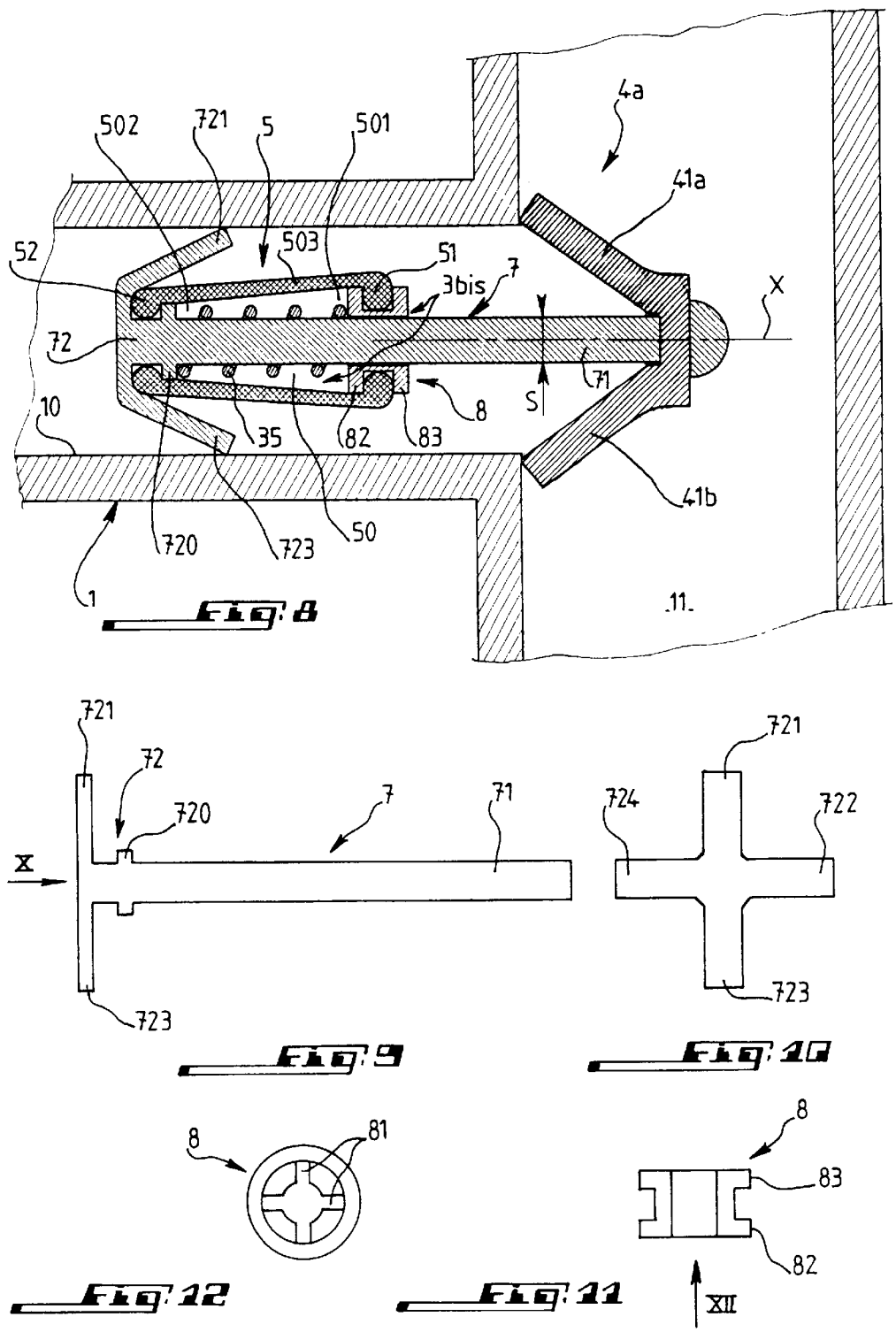

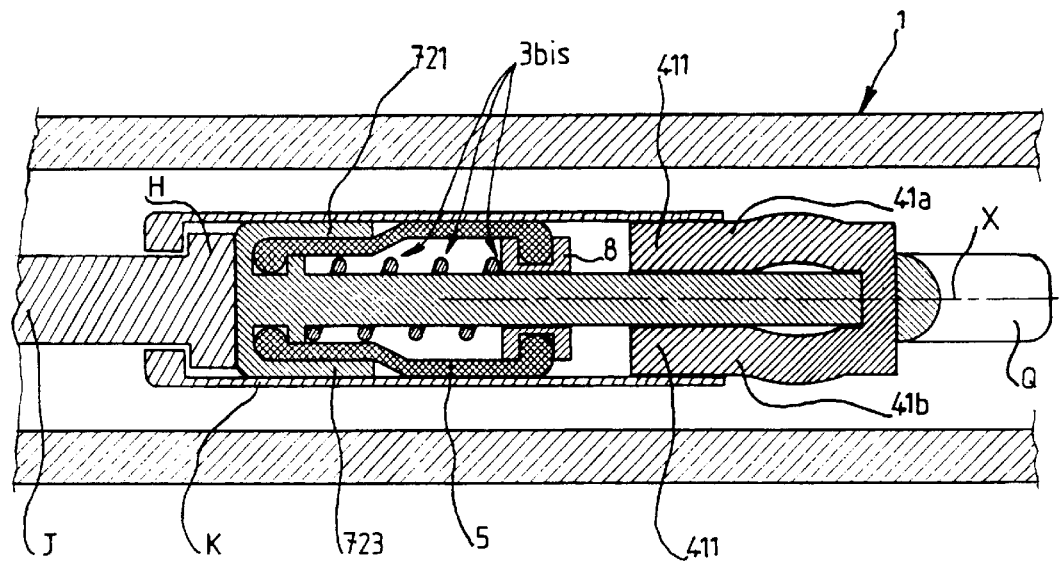
_Fig. 17_
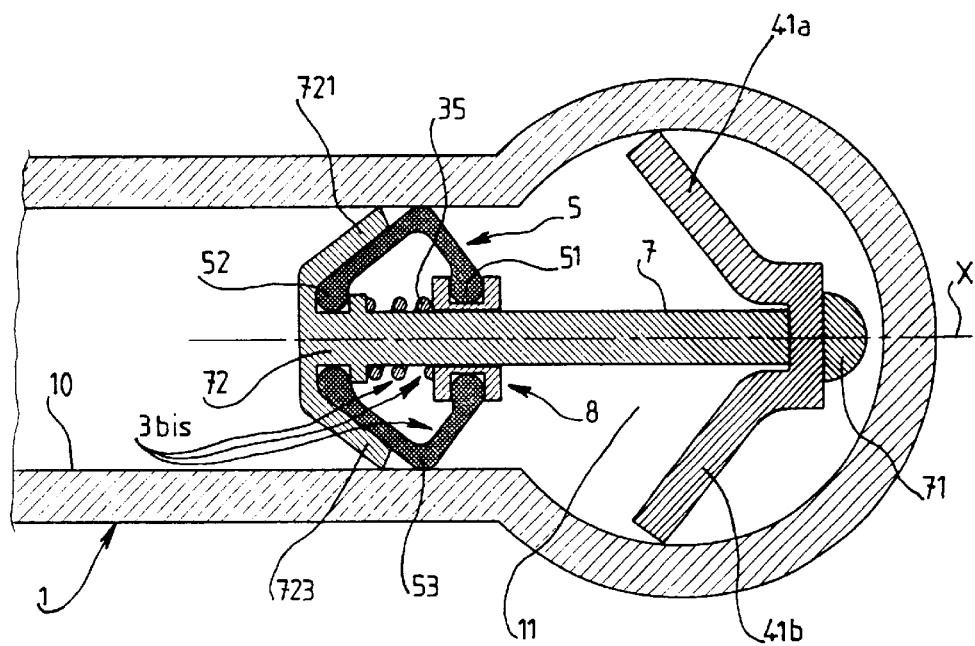
_Fig. 18_

UNIVERSAL SAFETY DEVICE AND PROCESS FOR PROTECTING A PIPELINE

FIELD OF THE INVENTION

The present invention generally concerns devices of the type represented by automatically triggered safety valves used in gas distribution systems, as well as a process for protecting such systems.

More precisely, a first aspect of the invention concerns a safety device selectively inserted into a fluid pipeline to protect it from an excessive flow of the fluid running through it, this device comprising a chamber having an upstream end and a downstream end, controlled admission means sensitive to a pressure loss in the pipeline between the upstream and downstream ends of the chamber, so as to selectively allow or prevent the establishment of a flow of fluid through the upstream end of the chamber, and retaining means for holding the chamber in place inside the pipeline.

Many devices of this type are known in the prior art, for example as shown by the valve described in U.S. Pat. No. 5,551,476.

Certain fluid distribution systems justify specific safety measures, imposed by the nature of the fluid transported and by the potential risk of damage to the pipes of which these systems are constituted.

For example, gas distribution systems in urban areas generally run under the roads and sidewalks, i.e., under public works subject to various interventions, and especially digging operations.

If a gas pipe is accidentally torn out or breached during such an operation, the resulting gas leak immediately causes a high risk of fire or explosion.

In this context, safety valves have been developed for shutting off gas pipes as soon as an abnormally high flow of gas through them is detected.

However, at present, safety valves can only be installed in new systems under construction, or possibly in existing systems, but only during their renovation.

In essence, given that the pipes of existing networks may have been built at different times and in accordance with different standards, that they do not necessarily have diameters defined with very high precision, that along their lengths they have obstacles, burrs, dents or various constrictions, and that the installation of a safety valve requires a perfect fitting of the valve body to the pipe, the insertion of safety valves into existing systems requires an intervention at the exact point of the insertion, i.e., an excavation that provides access to the chosen point in the system, a shutoff of the system, and a local adaptation of the system to the valve at the insertion point itself.

Thus, although it is known to insert devices of limited size, particularly for detection purposes, into a system under pressure through an access point outside the branch without having to perform a complicated intervention on the system, this technique, like catheterization for medical examinations, is currently unfeasible for installing safety valves.

The object of the invention, which falls within this context, is to offer a safety device capable of being installed in a system, without excavation, by being inserted into a branching point of this system.

To this end, the device of the invention, in keeping with the generic definition given in the above preamble, is essentially characterized in that it comprises a rigid core joined to the retaining means, and an inflatable envelope supported by the rigid core, this envelope having a lateral wall that at least partially delimits the chamber, and that faces one wall of the pipeline, in that the controlled admission means are calibrated to selectively allow the establishment of the flow of fluid through the upstream end of the chamber, at least until it allows an inflation of the envelope when the pressure loss is greater than a first predetermined threshold, and in that the inflatable envelope selectively seals off the pipeline, at least partially, by radially displacing its lateral wall toward the wall of the pipeline.

As a result of these characteristics, the safety device of the invention, once installed in a pipeline, performs a completely automatic monitoring of the flow of the fluid running through it, and uses this fluid's own energy to protect the pipeline from any potential excessive flow.

Although several prior documents already describe devices comprising a body, a valve, and an inflatable tubular envelope for sealing off a passage, none of these devices is designed to solve the problem of the invention.

Thus, for example, although the patents U.S. Pat. No. 2,856,002, DE 3 339 572 and GB 2 155 080 disclose sealing devices comprising an inflatable envelope, all of these devices are designed to be exclusively controlled by a fluid intentionally and selectively injected at a specifically controlled pressure in order to actuate them, none of these devices being equipped with a valve subject to a pressure loss to which it would be sensitive.

Preferably, the core extends along a longitudinal axis and the retaining means comprise a plurality of claws, each claw having one connecting end integral with the rigid core and one free end, and selectively assuming a folded position in which its free end is relatively close to the longitudinal axis, and an open position in which its free end is relatively distant from the longitudinal axis, each claw also being able to be elastically stressed toward its open position.

Given that the length of the claws must be adapted to the diameter of the pipeline and that the core of the device must have, relative to the diameter of the pipeline, a transverse diameter that allows it to be easily inserted into the pipeline, it may for example be advantageous to provide for one or more of its claws to have a length greater than half the diameter of the core.

In a first possible embodiment, the rigid core comprises for example a body delimited by a tubular wall and having an upstream end and a downstream end, the controlled admission means comprise a valve sensitive to pressure loss, supported by the body and disposed between the upstream and downstream ends of the body, and the inflatable envelope is outside the body and impermeably encloses a section of effective length of the tubular wall into which at least one first opening is cut, having for example the shape of a longitudinal slot.

This safety device can therefore comprise, on at least one of the upstream and downstream ends of the body, a corresponding upstream or downstream end piece carrying corresponding upstream or downstream retaining means and having at least one first assembly tab elastically inserted into the first opening.

Preferably, this device comprises, on the upstream and downstream ends of the body, respective upstream and downstream ends pieces having respective upstream and downstream shafts inserted into the body.

In one simple and effective embodiment of the invention, the valve comprises a helical spring attached to the downstream shaft, an upstream valve seat formed by an internal end of the upstream shaft, and a ball elastically stressed against the upstream valve seat by the helical spring.

The valve therefore comprises, for example, a downstream valve seat formed by an internal end of the downstream shaft, and cooperating with the ball.

At least one of the upstream and downstream shafts can also be bordered, outside the body, by a corresponding annular flange, to the periphery of which the corresponding upstream or downstream claws are attached by their connecting ends.

In the advantageous case where the device comprises both upstream claws and downstream claws, the latter preferably open like an umbrella in respective movements in opposing directions.

Likewise, in the advantageous case where the device of the invention comprises both an upstream shaft and a downstream shaft, the envelope preferably has upstream and downstream collars, respectively projecting past the upstream and downstream ends of the body and respectively fitting tightly around the upstream and downstream shafts.

According to a second embodiment of the invention, the rigid core essentially comprises for example a barrel, while a downstream end of the inflatable envelope delimiting the downstream end of the chamber fits firmly and tightly around a downstream end of the barrel, and an upstream end of the inflatable envelope delimiting the upstream end of the chamber is attached to a sleeve slide-mounted onto the barrel, the controlled admission means comprising at least one interstice defined between the sleeve and the barrel.

These controlled admission means can nevertheless also comprise a tension spring, preferably prestressed, that separates the upstream and downstream ends of the envelope from one another.

According to another variant that can be combined with the use of a tension spring, the controlled admission means can also comprise a non-monotonous variation in the section of the envelope.

In order to provide an optimal anchoring of the device, the claws are advantageously attached to an upstream end of the barrel, and the chamber can be inserted into a pipeline of predetermined maximum diameter, while the free ends of at least two claws rest against a conduit connecting to the pipeline so as to be separated from one another, in the open position, by a space larger than the predetermined maximum diameter.

Moreover, the safety device can advantageously be shaped so as to be able, when the claws are in the folded position, to be inserted into an installation tube ending in one or more stop fingers, this tube being selectively inserted into the pipeline by means of a flexible rod ending in a pusher, movable inside the tube and capable of expelling the device from the tube.

Centering tabs, extending radially around the barrel, can also be attached in a supple or flexible way to the downstream end of the barrel.

The safety device of the invention is preferably applied to the case in which the fluid is gaseous, and is used to full advantage when the envelope is also elastic, for example constituted by an elastomer.

The invention also concerns a process for protecting from an excessive flow a pipeline of predetermined cross section through which flows, in a predetermined flow direction, a fluid capable of exerting a variable differential pressure between upstream and downstream ends of the pipeline, this process using a variation of the differential pressure, when it is higher than a first predetermined threshold, to seal off a flow stream defined in the pipeline, and being essentially characterized in that it comprises the modalities and operations consisting of: dividing, by means of a radially deformable membrane, the fluid selectively flowing through the pipeline into a stream inside the membrane and a stream outside the membrane, the inside and outside streams having respective cross sections that are selectively variable and complementary to one another relative to the cross section of the pipeline; preventing the fluid that is not present in the inside stream from penetrating it in the flow direction for as long as the differential pressure exerted by the fluid is at most equal to a first threshold; admitting into the inside stream the fluid flowing in the flow direction when the differential pressure exerted by the fluid exceeds the first threshold; and preventing the fluid from leaving the inside stream in the flow direction at least when the differential pressure exerted by the fluid exceeds a second threshold.

Other characteristics and advantages of the invention will clearly emerge from the description given below as an illustrative and non-limiting example, in reference to the attached drawings, in which:

FIG. 4 is a cross-sectional view of the envelope of a device according to the first embodiment of the invention, seen on the incidence indicated by the arrows IV—IV in FIG. 5.

FIG. 5 is a longitudinal sectional view of the envelope of a device according to the first embodiment of the invention, seen on the incidence indicated by the arrows V—V in FIG. 4.

FIG. 6 is a front view of the downstream end piece of a device according to the first embodiment of the invention, seen from inside the body 2.

FIG. 7 is a longitudinal sectional view of the downstream end piece of a device according to the first embodiment of the invention, seen on the incidence indicated by the arrows VII—VII in FIG. 6.

FIG. 8 is a longitudinal sectional view of a device according to the second embodiment of the invention, shown at rest and illustrating a first variant of the retaining means and a first variant of the controlled admission means.

FIG. 9 is a side view of the barrel of the device of FIG. 8.

FIG. 10 is an end view of the barrel illustrated in FIG. 9, seen on the incidence indicated by the arrows X—X in FIG. 9.

FIG. 11 is a longitudinal sectional view of the sleeve of the device of FIG. 8.

FIG. 12 is an end view of the sleeve illustrated in FIG. 11, seen on the incidence indicated by the arrows XII—XII in FIG. 11.

FIG. 17 is a longitudinal sectional view of a device according to the second embodiment of the invention, illustrated during the phase of its installation into the pipeline.

FIG. 18 is a longitudinal sectional view of a device according to the second embodiment of the invention, using controlled admission means according to a third variant of embodiment of these means, and illustrated in its active position.

Figure 1:
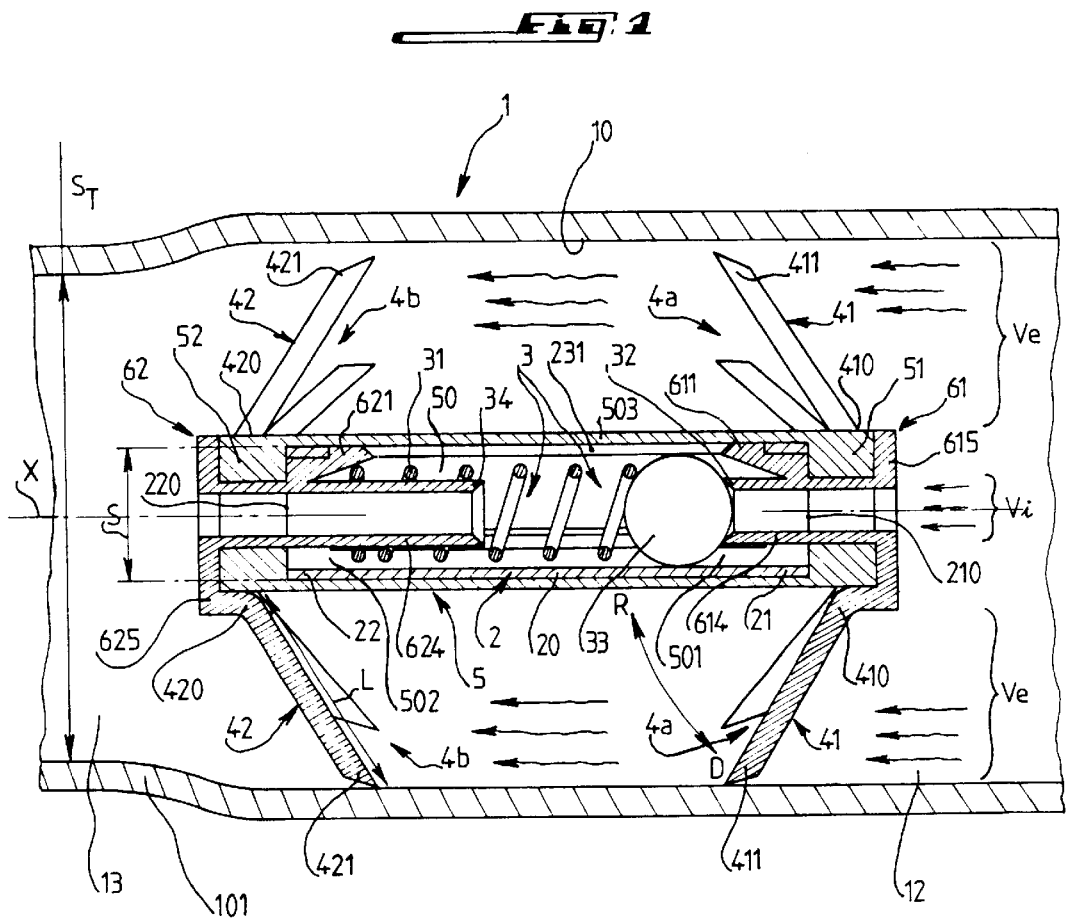
FIG. 1 is a longitudinal sectional view of a device according to the first embodiment of the invention, shown in the pipeline that it seals off in case of excessive flow.

The invention concerns a safety device inserted into a fluid pipeline 1, and more specifically into a gas pipeline in the preferred application of the invention, in order to protect this pipeline from an excessive flow of the gas running through it.

In a way that is itself known, this device essentially comprises a chamber 50, controlled admission means such as 3 (FIG. 1) and 3bis (FIGS. 8, 12, 17, 18), and retaining elements 4a, 4b for holding the chamber 50 in place inside the pipeline 1, preferably at the center of this pipeline in a radial direction.

The chamber 50 has an upstream end 501 and a downstream end 502, and the controlled admission means 3 and 3bis are sensitive to a pressure loss in the pipeline 1 between the upstream and downstream ends of the chamber, so as to selectively allow or prevent the establishment of a flow of fluid through the upstream end of a chamber.

The device of the invention is remarkable in that it comprises a rigid core such as 2 (FIGS. 1 through 3) or 7 (FIGS. 8, 9, 10, 17, 18) running along a longitudinal axis X and connected to retaining means 4a, 4b, as well as an inflatable envelope 5 supported by this rigid core 2, 7.

According to a second essential aspect of the invention, the envelope 5 has a lateral wall 503 that partially delimits at least the chamber 50, and that faces a wall 10 of the pipeline 1.

According to a third essential aspect of the invention, the controlled admission means 3, 3bis are calibrated to selectively allow the establishment of the flow of fluid through the upstream end 501 of the chamber 50, at least until it allows an inflation of the envelope 5 when the pressure loss in the pipeline on either side of the device is greater than a first given threshold F32, the inflatable envelope 5 then sealing off the pipeline 1, at least partially, by radially displacing its lateral wall 503 toward the wall 10 of the pipeline 1.

The retaining means 4a, 4b preferably comprise a plurality of claws 41, 41a, 41b, 42, each claw 41, 41a, 41b, 42 having a connecting end 410, 420 integral with the rigid core 2, 7 and a free end 411, 421.

Moreover, each claw selectively assumes a folded position R in which its free end 411, 421 is relatively close to the longitudinal axis X of the core 2 or 7, and an open position D in which its free end 411, 421 is relatively distant from the longitudinal axis X, each claw 41, 42 preferably being elastically stressed toward its open position D.

The rigid core such as 2 or 7 has a transverse diameter S substantially smaller than the diameter $S_T$ of the pipeline 1, while each claw 41, 41a, 41b, 42 advantageously has a predetermined length L greater than half the diameter S of the core 2 or 7.

According to the first embodiment illustrated in FIGS. 1 through 7, the rigid core is formed by a body 2, and the controlled admission means are constituted by a valve 3.

The body 2 is delimited by a tubular wall 20 and has an upstream end 21 pierced by an inlet 210, and a downstream end pierced by an outlet 220, the downstream end 22 following the upstream end in the flow direction of the gas.

The valve 3, which is housed in the body 3 between the inlet 210 and the outlet 220, is designed to be sensitive to the pressure loss due to the device in the pipeline 1, i.e., in this case, to the difference between the pressures exerted respectively by the gas in the upstream 12 and downstream 13 areas of the pipeline, on either side of the device.

The inflatable envelope 5, for example made of an elastomer material, is disposed outside the body and impermeably encloses at least a part of the tubular wall 20 of the body, this part of the wall of the body being passed through by one or more openings such as 231, 232, 233 having, in the example illustrated, the shape of longitudinal slots.

Figures 2, 3:
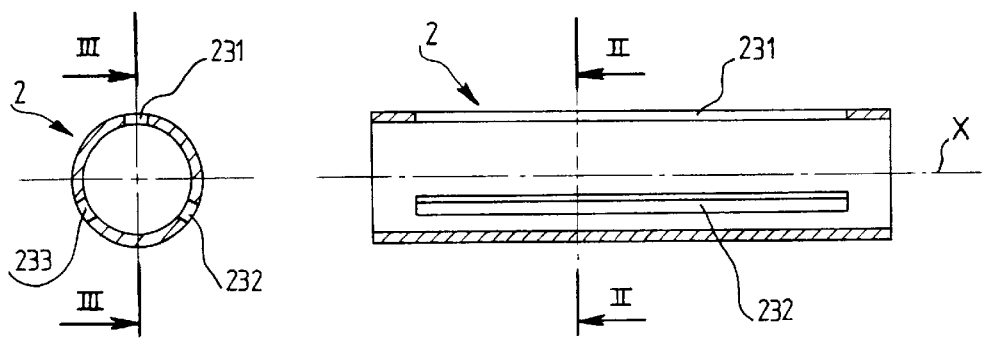
FIG. 2 is a cross-sectional view of the body of a device according to the first embodiment of the invention, seen on the incidence indicated by the arrows II—II in FIG. 3.
FIG. 3 is a longitudinal sectional view of the body of a device according to the first embodiment of the invention, seen on the incidence indicated by the arrows III—III in FIG. 2.
Figures 13, 14, 15:
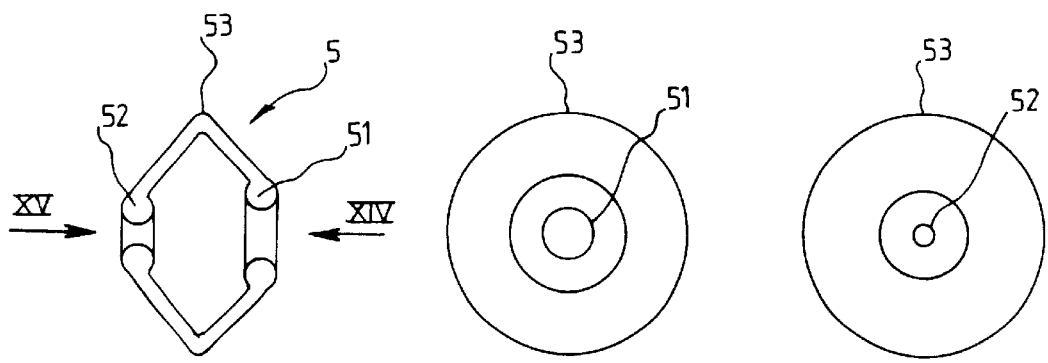
FIG. 13 is a longitudinal sectional view of an envelope, seen at rest and used in the second embodiment of the invention as a second variant of the controlled admission means.
FIG. 14 is an end view of the envelope illustrated in FIG. 13, seen on the incidence indicated by the arrows XIV—XIV in FIG. 13.
FIG. 15 is an end view of the envelope illustrated in FIG. 13, seen on the incidence indicated by the arrows XV—XV in FIG. 13.
Figure 16:
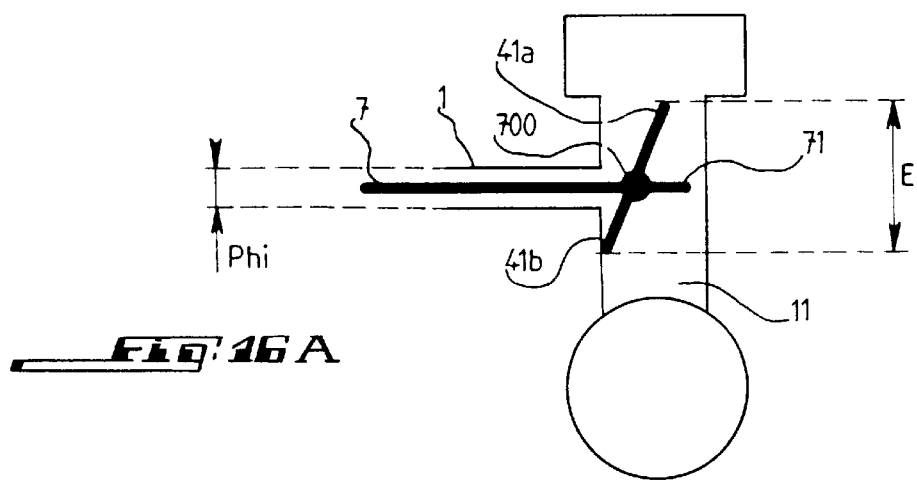
FIG. 16A is a sectional view of a pipeline in which a device according to the second embodiment of the invention is held in place by retaining means, shown alone and in accordance with a second embodiment of these retaining means.
FIG. 16B is a view similar to FIG. 16A, illustrating a third variant of the retaining means.
FIG. 16C is a view similar to FIG. 16A, illustrating a fourth variant of the retaining means.
Figure 16:
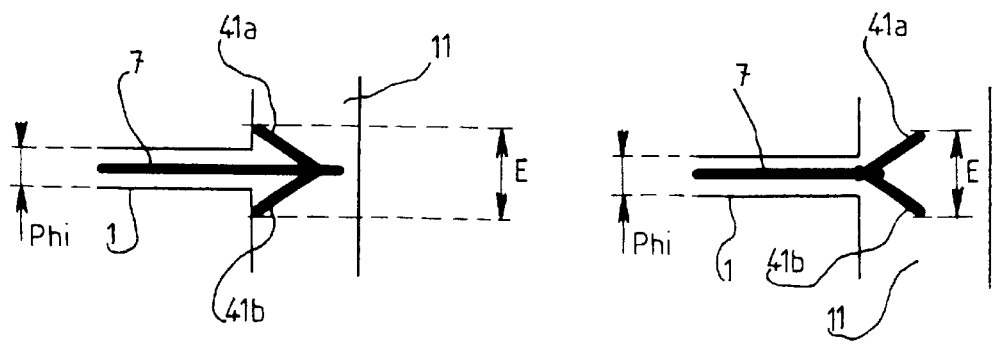

In other words, even through the envelope 5 can enclose the body 2 along its entire length as shown in FIG. 1, it is entirely possible to provide for this envelope 5 to enclose only one section of effective length of the body, as long as the openings such as 231 are cut into the part of the wall 20 of the body that is impermeably enclosed by the envelope 5.

This device includes, at the upstream 21 and downstream 22 ends of the body, respective upstream 61 and downstream 62 end pieces, each of which has an assembly tab such as 611 and 621, elastically inserted into the opening 231 of the wall 20 of the body 2.

These upstream 61 and downstream 62 end pieces also have respective upstream and downstream shafts 614 and 624 inserted into the body 2, each of which is tightly enclosed in a corresponding upstream and downstream collar 51 and 52 of the envelope 5, projecting past a corresponding end 210, 220 of the body.

The upstream 614 and downstream 624 shafts are bordered, outside the body, by respective upstream and downstream annular flanges 615 and 625, to the periphery of which are attached, by connecting ends 410 and 420, corresponding upstream 41 and downstream 42 claws, these claws constituting the retaining elements mentioned above.

Each claw such as 41 or 42 can assume a folded position R, in which its free end such as 411 or 421 is relatively close to the body 2, or an open position D, in which its free end such as 411 or 421 is relatively distant from the body 2.

Each claw such as 41 or 42 is also elastically stressed toward its open position D, either as a result of the intrinsic elasticity of the material of which it is constituted, or as a result of the elasticity of the collar 51 or 52 of the envelope 5 on which it rests, or as a result of both of these effects, the upstream claws 41 and the downstream claws 42 opening like an umbrella in respective movements from R to D, in opposing directions, and more precisely moving away from one another.

The body 2 has a transverse diameter S substantially smaller than the diameter ST of the pipeline, while the claws 41, 42 have a length L greater than half the diameter S of the body and for example at least equal to this diameter, in order to be able to reach the wall 10 of the pipeline 1 and to hook into it by moving from their folded position R to their open position D, an angle less than 90 degrees.

The valve 3 comprises, for example, a helical spring 31 attached to the downstream shaft 624 and compressively prestressed, an upstream valve seat 32 formed by an inner end of the upstream shaft 614, and a ball 33 elastically stressed against the upstream valve seat 32 by the helical spring 31.

When the device is designed to seal off the pipeline completely in case of excessive flow, the valve 3 also comprises a downstream valve seat 34 formed by an inner end of the downstream shaft 624 and intended to cooperate with the ball 33.

The device described up to this point, in reference to FIGS. 1 through 7, is assembled in the following way.

First of all, the body 2 is enclosed in the envelope 5 so that the collars 51 and 52 of the latter both rest on the outer part of the wall 20.

The downstream end piece 62 is then mounted onto the body 2 by inserting the tabs 621, 622 and 623 into the slots 231, 232 and 233.

Next, the spring 31 and the ball 33 are inserted into the body 2 through the upstream end 210 of the latter.

The upstream end piece 61 is then mounted onto the body 2 by inserting tabs such as 611 into the corresponding slots 231, 232 and 233.

Lastly, the collars 51 and 52 are slid outward until they surround the shafts 614 and 624.

For the installation of the device in the pipeline, the claws 41 and 42 must be placed in their folded position R, particularly in order to allow the device to move through the pipeline despite the existence of constrictions in its diameter, such as 101, after which these claws must assume their open position D in order to ensure the anchoring of the device into the pipeline.

This installation can be performed in various ways.

For example, the device can be temporarily placed inside a sheath attached to a cord that keeps the claws 41 and 42 folded. The device is then pushed into the pipeline by means of a flexible rod inserted into the pipeline at the same time as the cord. When the device has been placed inside the pipeline at the required place, its claws are released by a traction on the cord, while the flexible rod continues to be held in place. Then, the flexible rod is removed from the pipeline, all of which operations can be performed through a packing gland if the pipeline is already full of gas.

A second possibility, among others, consists of holding the free ends 411 and 421 of the claws close to one another during the installation of the device, by means of a relatively fragile link that is subsequently broken by the intentional inflation of the envelope 5.

The device described up to this point operates as follows.

The spring 31 presses the ball 33 into the valve seat 32 with a force F32 such that the gas normally flowing through the pipeline 1 cannot push the ball 33 back and thereby penetrate into the body 2 past the inlet of the upstream shaft 614.

In case of a rupture of the pipeline 1 downstream from the device, i.e. in this case to the left of the device as illustrated in FIG. 1, the pressure difference between the upstream 12 and downstream 13 areas increases, particularly because of the obstacles constituted by the claws 41 and 42 for an abnormally high gas flow, at which point the gas pushes the ball 33 back, penetrates into the body 2 and inflates the envelope 5 through the slots 231, 232, 233.

The inflation of the envelope creates an additional obstacle for the gas, further increasing the pressure difference between the upstream 12 and downstream 13 areas.

The inflation of the envelope 5, which is thus a positive feedback phenomenon, therefore continues more and more easily until the pressure difference between the upstream 12 and downstream 13 areas is such that the spring 31 is pushed back to the point where the ball 33 is pressed into the downstream valve seat 34 formed in the downstream shaft 624.

The pipeline 1 is thus sealed off, both by the pressing of the envelope 5 against the inner surface of the pipeline and by the pressing of the ball 33 into the seat 34.

If the envelope 5 is elastic and for example made of an elastomer material, after the pipeline has been repaired, the device can easily be returned to its initial state by applying a counter pressure inside the pipeline that reduces, eliminates, or reverses the pressure difference between the upstream 12 and downstream 13 areas.

The process implemented in the device as illustrated initially comprises a first step consisting of placing inside the pipeline 1 a radially deformable membrane, in this case constituted by the envelope 5, capable of dividing the fluid flowing through the pipeline 1 into a stream Vi inside this membrane and a stream Ve outside this membrane.

More precisely, the inside Vi and outside Ve streams are chosen so that their respective cross sections are capable of varying while remaining complementary to one another relative to the cross section of the pipeline.

The process implemented in the device as illustrated comprises a second step, which consists of preventing the fluid that is not present in the inside stream Vi from penetrating into it in the flow direction for as long as the differential pressure exerted by the fluid between the upstream 12 and downstream 13 areas is at most equal to a first threshold, which in this case corresponds to the prestressing F32 of the spring 31.

The process implemented in the device as illustrated also comprises a third step, which consists of admitting, into the inside stream Vi, the fluid running in the flow direction when the pressure differential exerted by the fluid between the upstream 12 and downstream 13 areas exceeds the first threshold F32.

Finally, the process of the invention implemented in the device as illustrated in FIGS. 1 through 7 comprises a fourth step, which consists of preventing the fluid from leaving the inside stream Vi in the flow direction, at least when the pressure differential exerted by the fluid between the upstream 12 and downstream 13 areas exceeds a second threshold F34, which in this case corresponds to the force that must be exerted counter to the force generated by the spring 31 in order to press the ball 33 into the seat 34.

FIGS. 8 through 18 illustrate a second embodiment of the device of the invention, in which the rigid core is constituted by a barrel 7.

A downstream end 52 of the inflatable envelope 5, which delimits the downstream end 502 of the chamber 50, fits firmly and tightly around the corresponding downstream end 72 of the barrel 7.

For example, the downstream end 52 of the envelope 5 is shaped like a collar and is wedged between a flange 720 of the barrel 7 and the base of centering tabs 721 through 724, these tabs being attached in a supple or flexible way to the downstream end 72 of the barrel 7 and being capable of extending radially around the barrel 7 in order to center it inside the pipeline 1.

The upstream end 51 of the inflatable envelope 5, which delimits the upstream end 501 of the chamber 50, is attached to a sleeve 8, itself slide-mounted onto the barrel 7.

For example, the sleeve 8 has two radial extensions 82 and 83 between which is inserted the upstream end 51 of the inflatable envelope 5, shaped like a collar.

In this second embodiment, the controlled admission means essentially comprise one or more interstices, such as 81, defined between sleeve 8 and the barrel 7.

However, these controlled admission means 3bis can also comprise, as shown in FIGS. 8 and 18, a tension spring 35, preferably prestressed, which separates the upstream and downstream ends 51, 52 of the envelope 5 from one another in the axial direction X of the barrel 7.

In addition to this tension spring 35, or in place of the latter, the controlled admission means 3bis can also include a non-monotonous variation 53 of the section of the envelope 5, this envelope therefore having, for example, one or more gussets (FIGS. 13 and 18), or a bulge of any shape, capable of increasing the pressure loss between the upstream area and the downstream area of the device inside the pipeline 1.

The retaining means 4a comprise claws, for example two claws 41a and 41b, attached to the upstream end 71 of the barrel 7.

These claws, which can have various shapes, can also be mounted in various ways relative to the barrel 7.

In particular, the claws 41a, 41b can be mounted in rotation around an axis 700 carried by the end 71 of the barrel 7 as shown in FIG. 16A, or can be elastically joined to this second end, as shown in FIGS. 16B and 16C.

While the details of embodiment of these claws are not important, the installation of the device according to the invention, on the other hand, can assume great importance.

One recommended way to optimize the installation of the device of the invention consists of making the two claws 41a, 41b reach a connecting conduit transverse to the pipeline 1 so as to be able, in the open position, to be separated from one another by a space E larger than the diameter Phi of this pipeline (FIGS. 16A through 16C), in the place where the envelope 5 of the device is retained.

As shown in FIG. 17, the device of the invention can be installed in the pipeline by means of a flexible rod J whose end carries a tube K.

For this reason, when the claws 41a, 41b are in the folded position and the envelope is in its at-rest configuration, this device has a shape such that it fits into a cylinder of small diameter, so that it can be inserted into the installation tube K.

This tube K ends, for example, in two stop fingers such as Q, the device being inserted into the tube so that the claws 41a, 41b are disposed so as to alternate with the fingers Q.

The flexible rod J ends in a pusher H movably mounted inside the tube K so as to be able to expel the device from the tube when the fingers Q come to rest against the wall of a transverse connecting conduit 11.

The claws, maintained up to this point in the position folded toward the axis X of the barrel 7, can elastically spread out to their open position and anchor the device inside the pipeline. The removal of the rod will drive the tube K via the pusher H, which will allow the extraction from the tube of the device, held in place in the pipeline by its claws.

The process of the invention, as implemented by the device according to the second embodiment, is identical to the process implemented by the device illustrated in FIGS. 1 through 7, except that it takes only the first operating threshold F32 into account, the fourth step of this process consisting simply of preventing the fluid from leaving the inside stream Vi in the flow direction no matter what the differential pressure exerted by the fluid between the upstream 12 and downstream 13 areas.

As one skilled in the art will understand by reading the present specification, the controlled admission means could take still other forms than those described and illustrated, especially if the fluid flowing through the pipeline is a liquid and/or if this fluid is capable of accumulating substantial kinetic energy in case of a rupture of the pipeline.

In this case, for example, referring to the first embodiment illustrated in FIGS. 1 through 7, it would be conceivable to dispense with the spring 31 and the ball 33, to permanently seal the downstream shaft 624, and to size the envelope 5, made of an elastomer material, so that this envelope encloses the body 2 with a predetermined radial prestressing.

Under these conditions, the triggering threshold would no longer be determined by the longitudinal prestressing of the spring 31, but by the radial prestressing of the envelope 5 on the body 2, the process then being reduced to placing inside the pipeline 1 a radially deformable membrane 5 capable of dividing the fluid flowing through the pipeline 1 into a stream Vi inside this membrane and a stream Ve outside this membrane, these streams being chosen so that their respective cross sections are capable of varying while remaining complementary to one another relative to the cross section of the pipeline, and of allowing a radial expansion of the inside stream Vi only when the differential pressure exerted by the fluid between the upstream 12 and downstream 13 areas reaches a threshold for which this pressure can overcome the radial prestressing of the membrane 5.

A third embodiment of this type, compared to the first two, would offer the advantage of having greater structural simplicity.

However, none of the three embodiments presented or described could be considered equivalent to either of the other two in all aspects, each embodiment having specific characteristics, particularly in terms of the reproducibility of the triggering threshold, the maintenance of this threshold over time and the capacity to resist any undesirable migration in the pipeline, which could result in a preference for one of these embodiments or another, or for combining certain of their characteristics as a function of the specific applications envisaged.

What is claimed is:

1. Safety device selectively inserted into a fluid pipeline in order to protect it from an excessive flow of the fluid running through it, this device comprising: a chamber (50) having an upstream end (501) and a downstream end (502); controlled admission means (3, 3bis) sensitive to a pressure loss inside the pipeline (1) between the upstream and downstream ends (501, 502) of the chamber, for selectively allowing or preventing the establishment of a flow of fluid through the upstream end (501) of the chamber; and retaining means (4a, 4b) for holding the chamber (50) in place inside the pipeline (1), characterized in that it comprises a rigid core (2, 7) joined to the retaining means (4a, 4b) and an inflatable envelope (5) supported by the rigid core (2, 7), this envelope having a lateral wall (503) that at least partially delimits the chamber (50), and that faces a wall (10) of the pipeline (1), in that the controlled admission means (3, 3bis) are calibrated to selectively allow the establishment of the flow of fluid through the upstream end (501) of the chamber (50), at least until it allows an inflation of the envelope (5) when the pressure loss is greater than a first predetermined threshold (F32), and in that the inflatable envelope (5) selectively seals off the pipeline (1), at least partially, by radially displacing its lateral wall (503) toward the wall (10) of the pipeline.

2. Safety device according to claim 1, characterized in that the core extends along a longitudinal axis (X) and in that the retaining means (4a, 4b) comprise a plurality of claws (41, 41a, 41b, 42), each claw (41, 41a, 41b, 42) having one connecting end (410, 420) integral with the rigid core (2, 7) and one free end (411, 421), and selectively assuming a folded position (R) in which its free end (411, 421) is relatively close to the longitudinal axis (X) and an open position (D), in which its free end (411, 421) is relatively distant from the longitudinal axis (X).

3. Safety device according to claim 2, characterized in that each claw (41, 41a, 41b, 42) is elastically stressed toward its open position (D).

4. Safety device according to claim 3, characterized in that the rigid core (2, 7) has a predetermined transverse diameter (S), in that each claw (41, 41a, 41b, 42) has a predetermined length (L), and in that at least one of the claws (41, 41a, 41b, 42) has a length (L) greater than half the diameter (S) of the core (2, 7).

5. Safety device according to claim 1, characterized in that the rigid core comprises a body (2) delimited by a tubular wall (20) and having an upstream end (21) and a downstream end (22), in that the controlled admission means comprise a valve (3) sensitive to a pressure loss, supported by the body (2) and disposed between the upstream and downstream ends of the body (2), and in that the inflatable envelope (5) is outside the body and impermeably encloses a section of effective length of the tubular wall (20) into which at least one first opening is cut (231).

6. Safety device according to claim 5, characterized in that it comprises, on at least one of the upstream (21) and downstream (22) ends of the body, a corresponding upstream (61) or downstream (62) end piece, carrying corresponding upstream (4a) or downstream (4b) retaining means and having at least one first assembly tab (611, 621) elastically inserted into the first opening (231).

7. Safety device according to claim 6, characterized in that it comprises, on the upstream (21) and downstream (22) ends of the body, respective upstream (61) and downstream (62) end pieces having respective upstream (614) and downstream (624) shafts inserted into the body (2).

8. Safety device according to claim 7, characterized in that the valve (3) comprises a helical spring (31) attached to the downstream shaft (624), an upstream valve seat (32) formed by an internal end of the upstream shaft (614), and a ball (33) elastically stressed against the upstream valve seat (32) by the helical spring (31).

9. Safety device according to claim 8, characterized in that the valve (3) comprises a downstream valve seat (34) formed by an internal end of the downstream shaft (624) and cooperating with the ball (33).

10. Safety device according to claim 7, characterized in that the core extends along a longitudinal axis (X) and in that the retaining means (4a, 4b) comprise a plurality of claws (41, 41a, 41b, 42), each claw (41, 41a, 41b, 42) having one connecting end (410, 420) integral with the rigid core (2, 7) and one free end (411, 421), and selectively assuming a folded position (R) in which its free end (411, 421) is relatively close to the longitudinal axis (X) and an open position (D), in which its free end (411, 421) is relatively distant from the longitudinal axis (X), and at least one of the upstream (614) and downstream (624) shafts is bordered, outside the body, by a corresponding annular flange (615, 625), to the periphery of which the corresponding upstream (41) or downstream (42) claws are attached by their connecting ends (410, 420).

11. Safety device according to claim 10, characterized in that it comprises both upstream claws (41) and downstream claws (42) that open like an umbrella in respective movements (from R to D) in opposing directions.

12. Safety device according to claim 7, characterized in that the envelope (5) has upstream and downstream collars (51, 52) respectively projecting past the upstream and downstream ends (210, 220) of the body and respectively fitting tightly around the upstream and downstream shafts (614, 624).

13. Safety device according to claim 5, characterized in that at least the first opening (231) is constituted by a longitudinal slot of the body.

14. Safety device according to claim 1, characterized in that the rigid core comprises a barrel (7), in that a downstream end (52) of the inflatable envelope (5) delimiting the downstream end (502) of the chamber (50) fits firmly and tightly around a downstream end (72) of the barrel (7), in that an upstream end (51) of the inflatable envelope (5) delimiting the upstream end (501) of the chamber (50) is attached to a sleeve (8) slide-mounted onto the barrel (7), and in that the controlled admission means (3, 3bis) comprise at least one interstice (81) defined between the sleeve (8) and the barrel (7).

15. Safety device according to claim 14, characterized in that the controlled admission means (3, 3bis) also comprise a tension spring (35) that separates the upstream and downstream ends (51, 52) of the envelope (5) from one another.

16. Safety device according to claim 15, characterized in that the tension spring (35) is prestressed.

17. Safety device according to claim 14, characterized in that the controlled admission means (3, 3bis) also comprise a non-monotonous variation of the section (53) of the envelope (5).

18. Safety device according to claim 14, characterized in that the core extends along a longitudinal axis (X) and in that the retaining means (4a, 4b) comprise a plurality of claws (41, 41a, 41b, 42), each claw (41, 41a, 41b, 42) having one connecting end (410, 420) integral with the rigid core (2, 7) and one free end (411, 421), and selectively assuming a folded position (R) in which its free end (411, 421) is relatively close to the longitudinal axis (X) and an open position (D), in which its free end (411, 421) is relatively distant from the longitudinal axis (X), and the claws (41a, 41b) are attached to an upstream end (71) of the barrel (7).

19. Safety device according to claim 18, characterized in that the chamber is inserted into a pipeline (1) of predetermined maximum diameter (Phi) and in that the free ends (411) of at least two claws (41a, 41b) are separated from one another, in the open position, by a space (E) larger than the predetermined maximum diameter (Phi).

20. Safety device according to claim 19, characterized in that it is shaped so as to be able, when the claws (41a, 41b) are in the folded position, to be inserted into an installation tube (K) ending in at least one stop finger (Q), this tube being selectively inserted into the pipeline (1) by means of a flexible rod (J) ending in a pusher (H) movable inside the tube (K) and capable of expelling the device from the tube.

21. Safety device according to claim 14, characterized in that it comprises centering tabs (721 through 724) attached in a supple or flexible way to the downstream end (72) of the barrel (7) and extending radially around the barrel (7).

22. Safety device according to claim 1 characterized in that the fluid is gaseous.

23. Safety device according to claim 1, characterized in that the envelope (5) is elastic.

24. Process for protecting from an excessive flow a pipeline (1) of predetermined cross section through which flows, in a predetermined flow direction, a fluid capable of exerting a variable differential pressure between upstream and downstream areas of the pipeline, this process using a variation of the differential pressure, when it is higher than a first predetermined threshold (F32), to seal off a flow stream defined in the pipeline, characterized in that it comprises the modalities and operations consisting of: selectively dividing, by means of a radially deformable membrane (5), the fluid selectively flowing through the pipeline into a stream (Vi) inside the membrane and a stream (Ve) outside the membrane, the inside and outside streams having respective cross sections that are selectively variable and complementary to one another relative to the cross section ($S_T$) of the pipeline; preventing the fluid that is not present in the inside stream (Vi) from penetrating into it in the flow direction for as long as the differential pressure exerted by the fluid is at most equal to a first threshold (F32); admitting into the inside steam (Vi) the fluid flowing in the flow direction when the differential pressure exerted by the fluid exceeds the first threshold (F32); and preventing the fluid from leaving the inside stream (Vi) in the flow direction, at least when the differential pressure exerted by the fluid exceeds a second threshold (F34).

* * * * *